United States Patent
Watanabe et al.

[11] Patent Number: 6,002,433
[45] Date of Patent: Dec. 14, 1999

[54] DEFECTIVE PIXEL DETECTING CIRCUIT OF A SOLID STATE IMAGE PICK-UP DEVICE CAPABLE OF DETECTING DEFECTIVE PIXELS WITH LOW POWER CONSUMPTION AND HIGH PRECISION, AND IMAGE PICK-UP DEVICE HAVING SUCH DETECTING CIRCUIT

[75] Inventors: Toshiyuki Watanabe, Ikoma; Nobuhide Dotsubo, Daito; Hiroshi Akizuki, Takatsuki, all of Japan

[73] Assignee: Sanyo Electric Co., Ltd., Japan

[21] Appl. No.: 09/154,374

[22] Filed: Sep. 16, 1998

Related U.S. Application Data

[62] Division of application No. 08/693,684, Aug. 12, 1996, Pat. No. 5,854,655.

[30] Foreign Application Priority Data

Aug. 29, 1995 [JP] Japan ..................................... 7-220886
Aug. 29, 1995 [JP] Japan ..................................... 7-220888

[51] Int. Cl.⁶ ....................................................... H04N 9/64
[52] U.S. Cl. .......................................... 348/246; 348/363
[58] Field of Search ..................................... 348/241, 243, 348/245, 246, 247, 248, 249, 362, 363; H04N 9/64

[56] References Cited

U.S. PATENT DOCUMENTS

| | | |
|---|---|---|
| 4,893,185 | 1/1990 | Fukushimna et al. ................... 348/247 |
| 5,047,861 | 9/1991 | Houchin et al. ......................... 348/247 |
| 5,625,413 | 4/1997 | Katoh et al. ............................. 348/246 |

FOREIGN PATENT DOCUMENTS

| | | |
|---|---|---|
| 44 19 068 | 12/1994 | Germany . |
| 5-260385 | 10/1993 | Japan . |
| 6-292088 | 10/1994 | Japan . |
| 6-350296 | 12/1994 | Japan . |

OTHER PUBLICATIONS

K.A. Bushaw et al., "Bad Pel Detection and Correction", *IBM Technical Disclosure Bulletin*, vol. 24, No. 11B, Apr. 1982, pp. 5898–5899.

*Primary Examiner*—Tuan Ho
*Attorney, Agent, or Firm*—Michaelson & Wallace; Peter L. Michaelson

[57] ABSTRACT

Image pick-up device reads image pick-up signals of all the pixels of CCD only when a light intercepting plate is moved from the light non-intercepting position to the light intercepting position for the first time after a battery replacement. By comparing the image pick-up signal from each pixel with a first threshold value, a possibly defective pixels are extracted. Thereafter, by reading the image pick-up signals for a prescribed number of times from CCD, accumulated value of the image pick-up signals of each of the possibly defective pixels is calculated. Based on the result of comparison between the accumulated value corresponding to each of the possibly defective pixels and second threshold value, an actually defective pixel is specified from the possibly defective pixels.

4 Claims, 7 Drawing Sheets

FIG.6
| G | B | G | B | G | B | G | B |
|---|---|---|---|---|---|---|---|
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
FIG.7
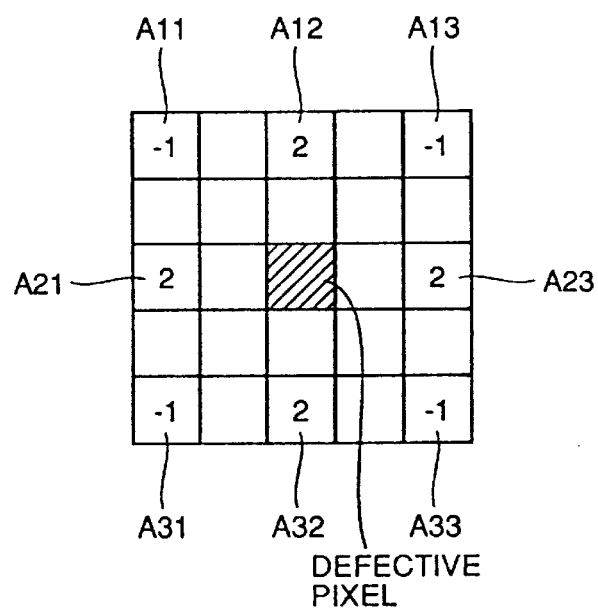
FIG.8
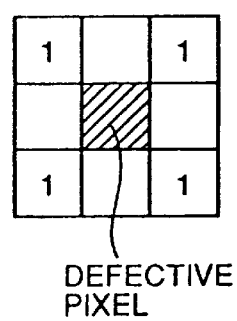

DEFECTIVE PIXEL DETECTING CIRCUIT OF A SOLID STATE IMAGE PICK-UP DEVICE CAPABLE OF DETECTING DEFECTIVE PIXELS WITH LOW POWER CONSUMPTION AND HIGH PRECISION, AND IMAGE PICK-UP DEVICE HAVING SUCH DETECTING CIRCUIT

This application is a division of patent application Ser. No. 08/693,684 filed on Aug. 12, 1996 U.S. Pat. No. 5,854,655.

BACKGROUND OF THE INVENTION

1. Field of the Invention

The present invention relates to a defective pixel detecting circuit for a solid state image pick-up device and image pick-up device including the same. More specifically, the present invention relates to a defective pixel detecting circuit of a solid state image pick-up device in, for example, a video camera or an electronic still camera which is capable of automatically detecting and correcting a defective pixel, and to an image pick-up device including the same.

2. Description of the Background Art

In an image pick-up device such as a video camera or an electronic still camera, a solid state image pick-up device such as a CCD (Charge Coupled Device) is used for converting an optical image to an image pick-up signal, generally. The solid state image pick-up device has two functions of photo-electric conversion and scanning. More specifically, the solid state image pick-up device includes photo-electric converting elements such as MOSs or photodiodes arranged two-dimensionally, forming a number of pixels. A charge image is formed in accordance with the intensity of light incident on each pixel, the charge images are scanned successively, and image pickup signals are taken in time sequentially.

Among the pixels of the solid state image pick-up device, there is possibly a so called defective pixel, which outputs a signal of an abnormal level without incident light. When there is such a defective pixel, quality of the pick-up image is degraded.

Such a defective pixel is generated not only as an initial defects, but it is also generated because of aging, as the solid state image pick-up device is used for a long period time.

The position of the defective pixel itself is fixed. Therefore, generally, the image pick-up signal from the defective pixel is corrected by storing the position thereof in advance.

More specifically, the defective pixel is detected at the time of delivery of the body of the image pick-up device and thereafter periodically, the position information of the defective element is stored in a storing device, and the image pick-up signal corresponding to the defective pixel is replaced by interpolation, using image pick-up signals from the pixels around the defective pixel. Such an interpolation is performed after the image pick-up device takes in the image signal and before processing the signal, by reading the position information of the defective pixel from the storing device and by interpolating the defective pixel by using the image pick-up signals one-dimensionally or two-dimensionally therearound.

Japanese Patent Laying-Open No. 5-260385 (H04N5/335), for example, discloses a method of detecting a defective pixel as follows. More specifically, the level of the image pick-up signal from each pixel of the CCD is compared with a prescribed threshold value with the light not incident on the CCD, and the position of the pixel outputting the image pick-up signal of an abnormal level, that means, higher than the threshold value, on the CCD, is stored in a register. When the pixel corresponding to the position data stored in the register does not continuously attain the abnormal level for a prescribed number of times (for example, ten times), the position data is erased from the register. Erroneous detection because of noise or the like can be prevented by this structure.

However, since it is necessary to include the white level to the black level of the CCD output in the dynamic range, the difference in level between the output of a normal pixel and of a defective pixel obtained at one photo-electric conversion is not so large, when outputs of the CCD with no incident light are considered. Therefore, if a defective pixel is to be detected by the structure of this prior art, setting of the threshold value is considerably difficult.

For example, if the threshold value is set too high, a defective pixel may be erroneously determined to be a normal pixel, and if the threshold value is set too low, the normal pixel may be erroneously recognized as a defective pixel.

Specially when a defective pixel cannot be recognized unless the output therefrom exceeds the threshold value continuously for ten times, for example, as in the above described prior art, a defective pixel may be erroneously determined to be normal if the output therefrom does not exceed the threshold value only once, and the defective pixel is overlooked.

Further, if the operation for detecting a defective pixel of the CCD is always performed at the time of power on of the video camera, that is, every normal image pick-up operation as in the prior art described above, it is possible to recognize generation of a defective pixel due to aging with high precision. However, it is necessary to monitor the image pick-up outputs from the CCD for a prescribed number of times in order to prevent erroneous detection, and it is necessary to operate the CCD and succeeding detecting circuitry such as an image memory for a certain time period for detection, which includes at least several frames. Namely, the signal processing inevitably consumes considerable power.

Now, aging of the CCD does not so frequently generate a defective pixel in general. Therefore, defective pixel detecting operation at every image pick-up operation is wasteful in view of power consumption. Further, recently, a battery having small capacity such as a dry battery is often used as power source for a video camera or an electronic still camera. In such a camera, frequent detecting operation means that much power is consumed for the detecting operation, and the time in which normal image pick-up operation is possible becomes shorter accordingly.

SUMMARY OF THE INVENTION

An object of the present invention is to provide a defective pixel detecting circuit for a solid state image pick-up device allowing detection of a defective pixel with sufficiently high precision even when threshold value itself is set not so precisely in the operation for comparing with the threshold value for detecting a defective pixel.

Another object of the present invention is to provide an image pick-up device which allows both reduction in power necessary for detecting a defective pixel caused by aging of the CCD and quick discovery of the defective pixel.

A still further object of the present invention is to provide an image pick-up device which allows both highly precise detection of a defective pixel and reduction in power.

In summary, the present invention provides a defective pixel detecting circuit for a solid state image pick-up device, including a light intercepting mechanism, an image memory and a defective pixel specifying circuit. The light intercepting mechanism intercepts incidence of light to the solid state image pick-up device. The image memory stores image pick-up signal of each pixel from the solid state image pick-up device with the incident light intercepted, as image data. The defective pixel specifying circuit specifies a defective pixel in the solid state image pick-up device based on the image data in the image memory. The defective pixel specifying circuit includes an operating circuit and an accumulated value calculating circuit. The operating circuit reads image data of one image plane obtained with the light intercepted from the image memory, and compares the data with a first threshold value pixel by pixel, to extract a possibly defective pixel (hereinafter referred to as a candidate pixel). The accumulated value calculating circuit reads image pick-up signals from the solid state image pick-up device a prescribed number of times with the light intercepted, and calculates accumulated value of the image data of every candidate pixel. The operating circuit compares the accumulated value of every candidate pixel with a second threshold value, and specifies that candidate pixel of which accumulated value exceeds the second threshold value, as a defective pixel.

More preferably, the operating circuit calculates the second threshold value based on a mean value of the image data of one image plane calculated during the process of extracting the candidate pixel and on a preset threshold value.

According to another aspect, the present invention provides an image pick-up device including an imaging device, a solid state image pick-up device, a light intercepting mechanism, an image memory, a defective pixel specifying circuit and an interpolating circuit.

The imaging device forms an image upon reception of light from a subject. The solid state image pick-up device converts the optical image formed by the imaging device to an image pick-up signal. The light intercepting mechanism intercepts incidence of light to the solid state image pick-up device. Image memory stores the image pick-up signal of each pixel from the solid state image pick-up device with the light intercepted as image data. Defective pixel specifying circuit specifies a defective pixel in the solid state image pick-up device based on the image data in the image memory. The defective pixel specifying circuit includes an operating circuit and an accumulated value calculating circuit. The operating circuit reads image data of one image plane obtained with the light intercepted from the image memory, and compares the data with a first threshold value pixel by pixel to extract a possibly defective pixel (candidate pixel). The accumulated value calculating circuit calculates, by reading the image pick-up signal from the solid state image pick-up device for a prescribed number of times with the light intercepted, the accumulated value of image data of every candidate pixel. The operating circuit compares the accumulated value of every candidate pixel with a second threshold value, and specifies that candidate pixel of which accumulated value exceeds the second threshold value as the defective pixel. The interpolating circuit interpolates the image pick-up signal corresponding to the defective pixel, by using image pick-up signals from the pixels therearound, based on the data of the position of the defective pixel specified by the operating circuit.

According to a still further aspect, the present invention provides an image pick-up device including a light intercepting mechanism, a battery, and a defective pixel detecting circuit. The light intercepting mechanism can be selectively moved between two positions, that is, a light intercepting position where the light incident on the solid state image pick-up device is intercepted, and a non-intercepting position. The battery is attached to a battery attaching portion and supplies power to the body of the image pick-up device. The defective pixel detecting circuit detects a defective pixel of the solid state image pick-up device based on the level of the image pick-up signal of each pixel from the solid state image pick-up device, with the light intercepting mechanism positioned at the intercepting position. The defective pixel detecting circuit performs the defective pixel detecting operation only when the light intercepting mechanism is moved from the non-intercepting position to the light intercepting position for the first time after the battery is attached to the battery attaching portion.

Therefore, an advantage of the present invention is that once a candidate pixel is extracted by rough thresholding operation, and the defective pixel is specified based on the accumulated value of each pixel accumulated by reading the image pick-up signal a plurality of times, so that defective pixel can be detected with sufficiently high precision as compared with the precision in setting the threshold value.

Another advantage of the present invention is that power consumption necessary for detecting the defective pixel caused by aging of the CCD can be reduced while the defective pixel can be discovered quickly as detection of the defective pixel is performed once at every battery exchange.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a schematic diagram showing arrangement of color filters provided on a light receiving surface of CCD2.

FIG. 7 is a first schematic diagram showing interpolating operation by an interpolating circuit 40.

FIG. 8 is a second schematic diagram showing interpolating operation by the interpolating circuit 40.

DESCRIPTION OF THE PREFERRED EMBODIMENTS

Figure 1:
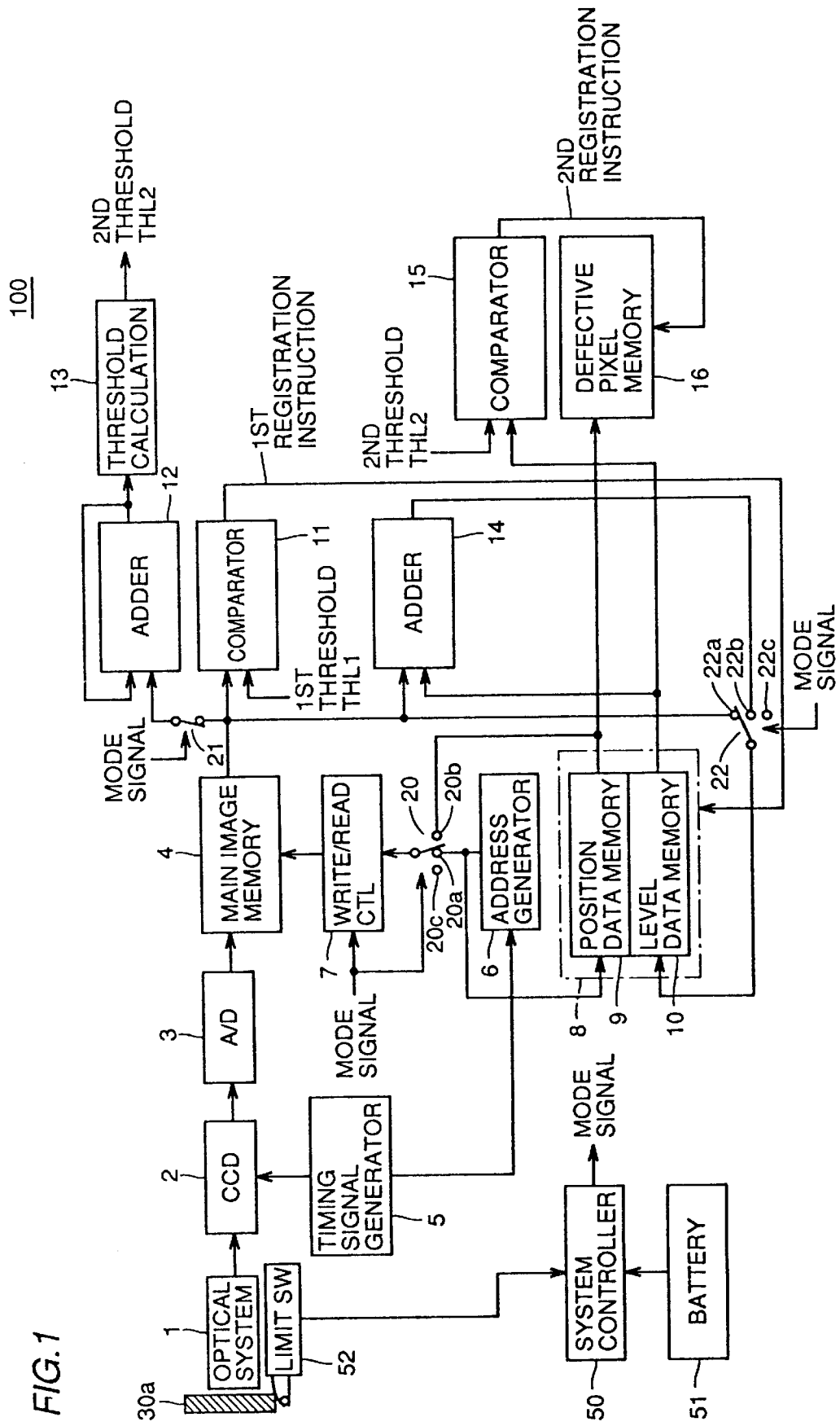
FIG. 1 is a schematic block diagram showing a structure of a defective pixel detecting portion of an image pick-up device 100 in accordance with a first embodiment of the present invention.

FIG. 1 is a schematic block diagram of a main portion of an image pick-up device 100 in accordance with the first embodiment of the present invention. FIG. 1 shows a defective pixel detecting portion of an electronic still camera, as an example.

Referring to FIG. 1, light from a subject (not shown) enters CCD2 through an optical system 1. The incident light is subjected to photo-electric conversion by the CCD, converted to digital signals by an analog/digital converter 3, and stored in a main image memory 4.

Here, the optical system 1 includes a plurality of lenses and, in general, it also has functions of a low pass filter, an infrared cutting filter, a finder and so on.

On the entrance side of the optical system 1, there is arranged a mechanical light intercepting mechanism 30 which intercepts light from the subject manually or by electric power.

The light intercepting mechanism 30 is constituted by a light intercepting plate 30a and a lever (not shown) for moving the light intercepting plate manually or by electric power. Light intercepting plate 30a prevents incidence of external incident light to CCD2 when it is positioned on the optical axis of the lens constituting the optical system 1 (light intercepting position). By contrast, when it is out of the optical axis (non-intercepting position), it allows incidence of light to CCD2.

Light intercepting plate 30a is always positioned at either of the two positions mentioned above, and the position is moved by manual operation of the lever or electrical driving, by the operation of the user. Light intercepting mechanism 30 also serves to protect the optical system 1 when the device is not in image pick-up operation.

Near the light intercepting position mentioned above, there is provided a limit switch 52 which serves as a power switch of the camera body. An output from limit switch 52 is input to a system controller 50.

While the light intercepting plate 30a is at the light intercepting position, light intercepting plate 30a is in contact with limit switch 52. Upon reception of the output from limit switch 52, system controller 50 stops power supply from battery 51 to various portions of the camera, setting the camera to power off state.

Meanwhile, when light intercepting plate 30a moves from the light intercepting position to non-intercepting position by manual operation, for example, contact between limit switch 52 and light intercepting light 30a is canceled. Upon reception of the output from switch 52, system controller 50 supplies power from battery 51 to various portions of the camera, thus the camera is set to the on state.

Battery 51 is detachably contained in a battery containing portion provided on the camera body, and supplies power to various portions of the camera when power is on. Meanwhile, when the battery is to be exchanged, the user may change the battery by taking out the battery.

The incident light from the subject which has passed through optical system 1 forms an image on CCD2, and it is subjected to photo-electric conversion to image pick-up signal by CCD2. CCD2 is driven such that the incident light is photoelectrically converted in the period of 1 frame, for example.

CCD2 includes m pixels. Image pick-up signal from each pixel is converted to a digital signal by an A/D converter 3 of the succeeding stage, and A/D converted outputs of all the pixels are stored as image data in main image memory 4. Here, CCD2 is driven controlled by a reference timing signal output from a timing signal generating circuit 5. The reference timing signal is also supplied to an address generating circuit 6.

Address generating circuit 6 includes a counter for counting the reference timing signal, and outputs the count value as an address in one to one correspondence to each pixel of the CCD2. For example, when the coordinate of the pixel on the upper left corner of the CCD2 viewed from the entrance side is represented as (1, 1), the address of this pixel would be "1". Meanwhile, the address of the central pixel on CCD2 is "m/2", and the address of the pixel at coordinate at the lower right corner is "m".

Upon reception of address information from address generating circuit 6, a read/write control circuit 7 controls writing or reading operation of the main image memory 4, using the information as write address or read address. As will be described later, control of write/read operation of the main image memory 4 by write/read control circuit 7 is controlled in accordance with a mode signal generated from system controller 50.

Switch 20 selects and supplies to write/read control circuit 7 either the address output from address generating circuit 6 or the address stored in position data memory portion 9, which will be described later. The selection position of switch 20 is selectively switched to 20a, 20b and 20c in accordance with the mode signal from system controller 50. Namely, when switch 20 is set at the selection position 20a, the address signal from address generating circuit 6 is supplied to write/read control circuit 7. When switch 20 is set at selection position 20b, the address from position data memory portion 9 is supplied to write/read control circuit 7. When switch 20 is set to select position 20c, address signal is not supplied to write/read control circuit 7.

When defective pixel detecting operation is to be performed, one of the three different mode signals for successively executing three modes, that is, candidate pixel registration mode, accumulated value calculating mode and defective pixel determining mode, is output selectively.

Candidate pixel memory 8 includes a position data memory portion 9 and a level data memory portion 10. Position data memory portion 9 stores the address in the main image memory 4 of the candidate pixel which is determined to be possibly defective, as position information. Level data memory portion 10 stores the image data of the candidate pixel as level information.

Candidate Pixel Registration Mode

In candidate pixel registration mode, switch 20 is set to switch position 20a. Comparator 11 compares, in accordance with the address signal output from address generating circuit 6, the image data value of respective pixels output successively from main image memory 4 with a preset first threshold value THL1, under the control of write/read control circuit 7. When a pixel of which image data value exceeds the first threshold value THL1 is detected, comparator 1 generates a first registration instruction signal to candidate pixel memory 8. In response to the first registration instruction signal, candidate pixel memory 8 stores the address and image data value of the pixel at prescribed positions of position data memory portion 9 and level data memory portion 10, respectively. Between main image memory 4 and level data memory portion 10, a switch 22 controlled by the mode signal from system controller 50 is placed. In candidate pixel registration mode, switch 22 is switched to the side of fixed contact 22a. Therefore, simultaneously with the input of the image data read from main image memory 4 to converter 11, it is also input to level data memory portion 10.

Meanwhile, switch 21 is controlled by the mode signal from system controller 50 and is rendered conductive in the candidate pixel registration mode. Therefore, image data output from main image memory 4 is input to an adder 12.

Adder 12 calculates sum of the image data of all the pixels successively read from the main image memory 4 in the candidate pixel registration mode. More specifically, it is an adder receiving image data from the main image memory and performs digital integration, thus calculating the sum of the image data of all the pixels of one image plane (one frame). A threshold value calculating circuit 13 receives the result of calculation of the sum of image data of all the pixels from adder 12, and calculates a second threshold value THL2 used in a defective pixel determining mode, as will be described later, in accordance with the following equation (1).

$$THL2 = \sum_{i=1}^{m} D[i]/m \times N + Q \tag{1}$$

In equation (1), D[i] (i: an integer from 1 to n) represents image data value of each pixel, m represents the total number of pixels in the CCD, and n represents total number of reading of the image data from the CCD in the candidate pixel registration mode and in the accumulated value calculating mode, that is, the number of photo-electric conversion. It is assumed that the number n of photo-electric conversion is set to a prescribed value in advance. Further, Q represents an offset value of the threshold value set in advance in accordance with experiment or the like.

Accumulated Value Calculating Mode

Adder 14 reads image data corresponding to the candidate pixel from the main image memory every time the stored content of the main image memory 4 is updated as CCD2 outputs photo-electrically converted output at every 1/30 sec, in the accumulated calculating mode. More specifically, adder 14 reads the image data using the address of the candidate pixels stored in the position data memory portion 9 as the read address, and adds the read data to the image data of the same candidate pixel stored in the level data memory portion 10. In the accumulated value calculating mode, switch 22 is closed to the fixed terminal 22b. Therefore, the value to be added output from adder 14 is output to level data memory portion 10 through switch 22, and the stored content of the image data corresponding to the candidate pixel in level data memory portion 10 is updated. More specifically, in level data memory portion 10, accumulated value of the image data of the candidate pixel is constantly stored, for every candidate pixel.

In the accumulated value calculating mode, switch 20 is switched to the side of the fixed contact 20b. Therefore, to the write/read control circuit 7, addresses of the candidate pixels stored in the position data memory portion 9 are input successively. Write/read control circuit 7 successively reads only the image data of candidate pixels, using these addresses as read addresses.

Defective Pixel Determining Mode

Thereafter, based on the accumulated value calculated for every candidate pixel in the accumulated value calculating mode, defective pixel is determined. A comparator 15 compares the accumulated value of image data of each of the candidate pixels stored in level data memory 10 with the second threshold value THL2 calculated in threshold value calculating circuit 13, for every candidate pixel, in defective pixel determining mode. When a candidate pixel of which accumulated value exceeds the second threshold value THL2 is detected, comparator 15 outputs a second registration instruction signal. Defective pixel memory 16 takes the position address of the corresponding pixel from position data memory portion 9, and stores it as the position data of defective pixel, in accordance with the second registration instruction signal output from comparator 15.

At the time when the candidate pixel registration mode, accumulated value calculating mode and defective pixel determining mode are all completed, finally, the address of the pixel which is determined to be defective is stored in the defective pixel memory 16, as described above.

The defective pixel detecting operation will be described in greater detail.

Figure 3:
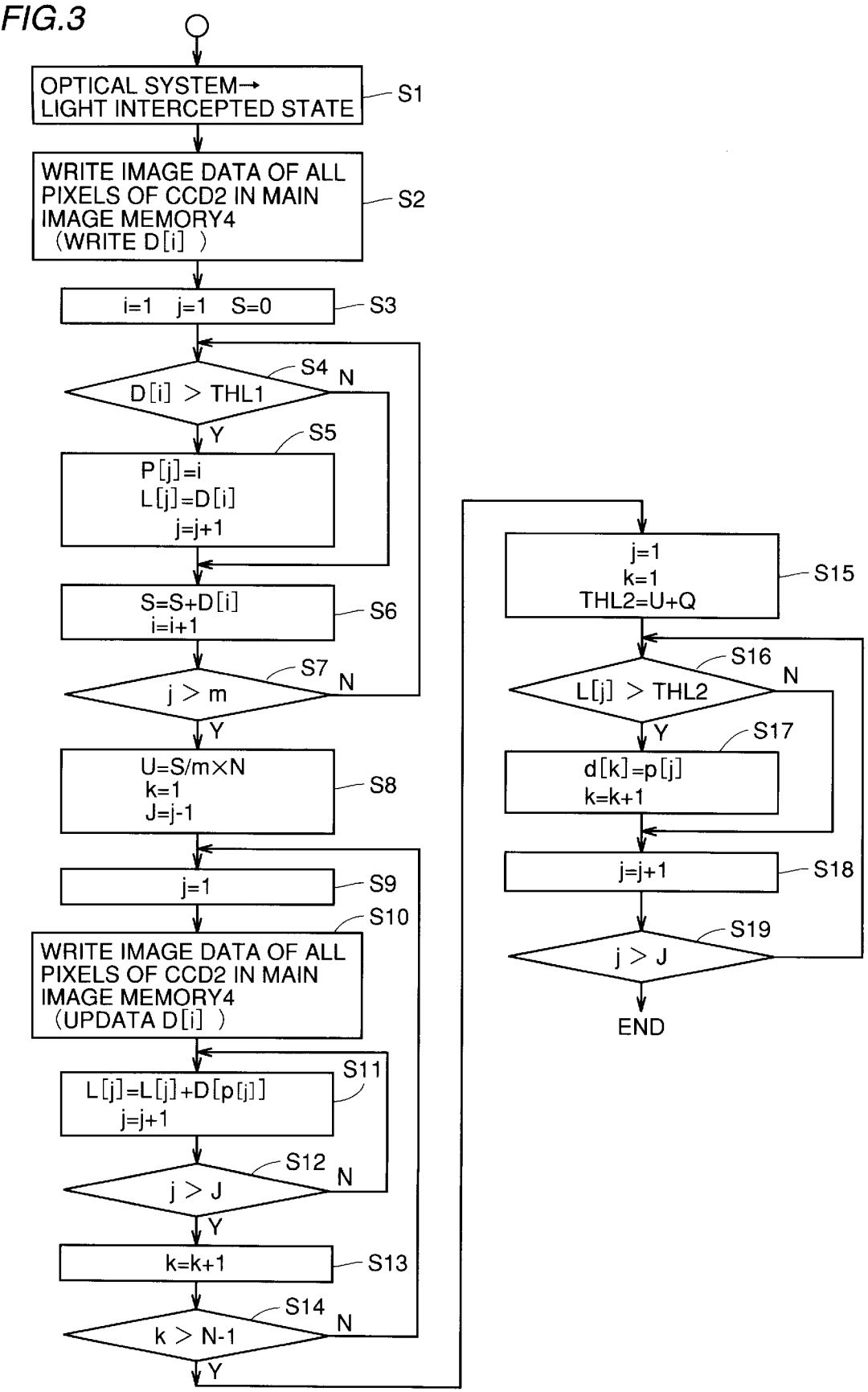
FIG. 3 is a flow chart showing the defective pixel detecting operation in image pick-up device 100.

FIG. 3 is a flow chart showing the defective pixel detecting operation.

Referring to FIG. 3, in step S1, incidence of light to optical system 1 is intercepted by light intercepting mechanism 30.

Thereafter, with the light intercepted, CCD2 performs the first photo-electric conversion, and at photo-electric converting elements corresponding to respective pixels, signals corresponding to the intensity of incident light are generated. System controller 50 outputs a mode signal which corresponds to the candidate pixel registration mode. Therefore, receiving this signal, switch 20 has been switched to the side of the fixed contact 20a. Read/write control circuit 7 stores outputs corresponding to all the pixels of the CCD2 which have been subjected to digital conversion, in main image memory 4 pixel by pixel based on the address output from the address generating circuit 6 applied through switch 20 (step S2).

Figure 2:
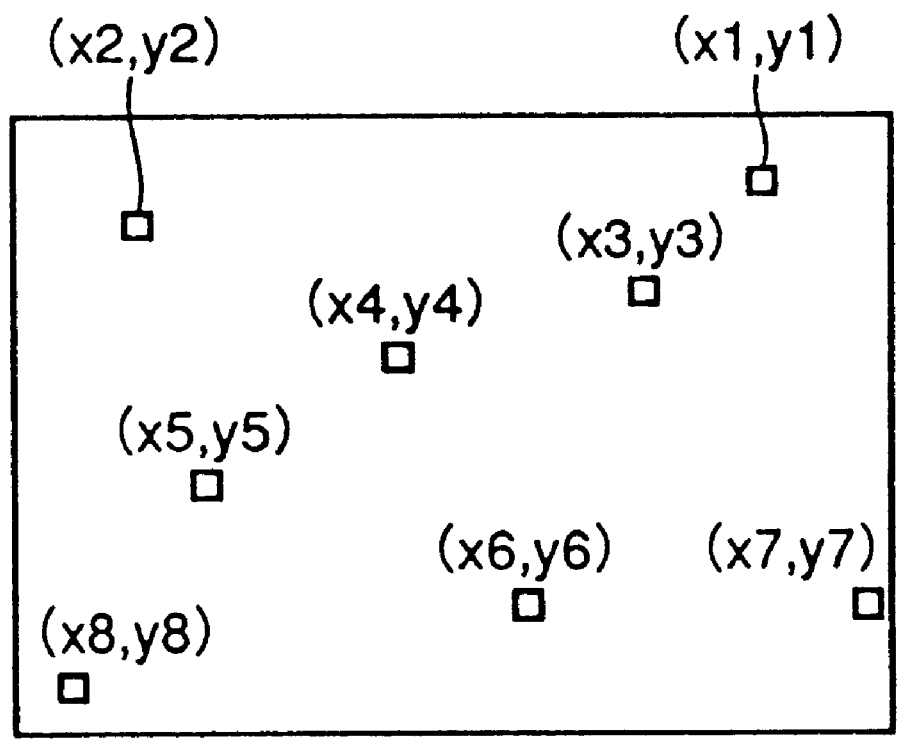
FIG. 2 is a schematic diagram showing an example of arrangement of defective pixels in a CCD2 shown in FIG. 1.

In FIG. 2, image data of the pixel corresponding to address i is represented by D[i]. It is assumed that there are 1 to m addresses and image data D[1] to D[m], so that all the pixels of which number is m can be stored.

For the operation in the candidate pixel registration mode, read/write control circuit 7 initially sets integer auxiliary variables i and j both to "1" and variable S to "0" (step S3).

When storage of image data of all the pixels in main image memory 4 is completed, write/read control circuit 7 instructs start of reading of image data of each pixel from main image memory 4 (step S4).

The read image data D[i] of each pixel is compared with the first threshold value THL1 in comparator 11 (step S4).

When it is determined that image data D[i] exceeds the threshold value THL1, the address i of the corresponding pixel is stored in position data memory portion 9 as address P[j] of a candidate pixel, and image data D[i] is stored as image data L[j] corresponding to the candidate pixel, in level data memory portion 10. Simultaneously, the value of variable j, which is the number of the candidate pixels, is incremented (step S5).

Meanwhile, if it is determined that the read image data D[i] is not higher than threshold value THL1, the process proceeds to the next step (step S4).

Therefore, when a pixel of which image data D[i] exceeds the threshold value THL1 is detected, a pair of the image data value and the address value in the main image memory 4 corresponding to the position on the CCD2 of the pixel is stored in the candidate pixel memory 8.

For example, when the condition D[i]>THL1 is satisfied by eight pixels having the coordinates (x1, y1), (x2, y2), (x3, y3), (x4, y4), (x5, y5), (x6, y6), (x7, y7) and (x8, y8) on CCD2, as shown in FIG. 2, the address values of these pixels on the main image memory 4 are stored as P[1] to P[8] in position data memory portion 9. Simultaneously, image data values corresponding to these eight pixels are stored in level data memory portion 10.

Thereafter, to the variable S used for calculating the image data value of all the pixels, the read image data D[i] from CCD2 is added. Meanwhile, the auxiliary variable i indicating the address of the pixel which is being processed is incremented (step S6).

In step S7, the value of the auxiliary variable i is compared with the maximum value m of the pixel address. If it is determined that the value of the auxiliary variable i is not higher than the maximum value m of the pixel address, the process returns to step S4. Meanwhile, if the value of the auxiliary variable i is determined to be larger than the maximum value m of the pixel address, the process proceeds to the next step (step S7).

Accordingly, the operation from step S4 to step S6 is repeated on all the pixels, that is, image data D[i] of all addresses. In step S7, when it is determined by the write/read control circuit 7 that the value of the auxiliary variable i exceeds the number m of all the pixels in CCD2, that is, the number of all the addresses prepared for storing image data in main image memory 4, the candidate pixel registering operation is completed.

Thereafter, in order to set the variable value used for the next operation mode, the following operation is carried out (step S8).

First, according to the equation (2) below, a value U is calculated, which is the product of the mean value of the image data of all the pixels by the prescribed number N of photoelectric conversion.

$$U = S/m \times N \tag{2}$$

The value of the auxiliary variable k is initially set to "1", and the number of candidate pixels J stored in candidate pixel memory 8 is provided as J=j−1.

Thereafter, the process proceeds to the accumulated value calculating mode.

In this mode, the auxiliary variable j is initially set to "1" (step S9).

Thereafter, write/read control circuit 7 instructs second writing operation of the photo-electrically converted output from the CCD to the main image memory 4, with the light intercepted. By the image data corresponding to the second photo-electrically converted outputs, image data of all the addresses in main image memory 4 are updated (step S10).

In accumulated value calculating mode, switch 20 is switched to the side of fixed contact 20b, while switch 21 is opened. Based on the position data of candidate pixel registered in position data memory portion 9, read/write control circuit 7 instructs reading of image data corresponding to the candidate pixel, obtained by the second photo-electric conversion, from the main image memory 4. Adder 14 adds the image data obtained by the second photo-electric conversion and the image data obtained by the first photo-electric conversion stored in level data memory portion 10, both corresponding to the same candidate pixel, and outputs the result.

In the accumulated value calculating mode, switch 22 is switched to the side of fixed terminal 22b. Therefore, by the added value output from adder 14, image data value corresponding to each candidate pixel in level data memory portion 10 is updated. Namely, the value of image data L[j] in level data memory portion 10 is updated, in accordance with the equation (3) below.

$$L[j] = L[j] + D[p[j]] \tag{3}$$

Thereafter, in write/read control portion 7, the value of the auxiliary variable j used for controlling the operation is incremented (step S11).

In step S12, it is determined whether the value of the auxiliary variable j exceeds the number J of all the candidate pixels (step S12). If the value of the variable j does not exceed the number J of all the candidate pixels, the process returns to step S11. Meanwhile, if the value of the variable j exceeds the number J of all the pixels, the process proceeds to the next step. Accordingly, for the image data corresponding to all the candidate pixels, new image data corresponding to the second photo-electric conversion outputs are added.

Thereafter, the value of the auxiliary variable k used for controlling the accumulated value calculating mode is incremented (step S13).

As described above, if the total number of photo-electric conversion is N, the value of the auxiliary variable k is compared with N−1 (step S14).

If the value k is smaller than N−1, the process again returns to step S9. Meanwhile, if the value k exceeds N−1, the process proceeds to the next step.

Therefore, the accumulated value calculating operation from step S9 to S13 is repeated (N−1) times on the image data corresponding to all the candidate pixels.

The third, fourth, . . . Nth photo-electrically converted outputs are accumulated for every candidate pixel. In other words, the accumulated value obtained by adding all of the N image data is stored for each candidate pixel, in level data memory portion 10.

In the example shown in FIG. 2, the address value of each candidate pixel is kept stored in position data memory portion 9, while the accumulated value of each of the eight pixels registered as candidate pixels is held in level data memory portion 10.

In the accumulated value calculating mode, switch 21 is opened, and the output from level data memory portion 10 is not output to adder 12.

When calculation of accumulated value of N times of image data of the candidate pixels is completed, the processing by the write/read control circuit 7 proceeds to the next defective pixel determining mode.

In the defective pixel determining mode, the values of auxiliary variables j and k are initially set to "1". Further, the second threshold value THL2 for determining defective pixel is provided in accordance with the following equation (4).

$$THL2 = U + Q \tag{4}$$

Here, the value U is calculated in step S8 of the candidate pixel registration mode, and it is assumed that offset value Q is set in advance. Calculation of the second threshold value THL2 corresponds to equation (1).

Thereafter, comparator 15 compares the accumulated value L[j] of each of the candidate pixels stored in level data memory portion 10 with the second threshold value THL2 (step S16).

If the accumulated value L[j] of the jth candidate pixel is larger than the threshold value THL2, the candidate pixel is determined to be an actually defective pixel, and comparator 15 activates the second registration instruction signal. Defective pixel memory 16 receives the address value p[j] of the defective pixel from position data memory portion 9, and stores it as the address value d[k] of the actually defective pixel. Thereafter, the value of the auxiliary variable k is incremented (step S17).

Meanwhile, if the accumulated value L[j] corresponding to the candidate pixel is not higher than the second threshold value THL2, the process proceeds to step S18. Therefore, the candidate pixel of which accumulated value L[j] is not higher than the second threshold value THL2 is determined to be not actually defective, and the address value corresponding to that candidate pixel is not transferred to the defective pixel memory 16.

In step S18, the value of the auxiliary variable j is incremented. Thereafter, whether the value of the auxiliary variable j exceeded the number J of all the candidate pixels is determined (step S19).

If the value of the variable j is not higher than the number j of all the candidate pixels, the process returns to step S16. Meanwhile, if the value of the variable j exceeds the number J of all the candidate pixels, the defective pixel determining mode is completed.

Namely, the determining operation from step S16 to S18 is performed on all the candidate pixels. Accordingly, of the candidate pixels, only the address of that candidate pixel of which corresponding accumulated value exceeds the second threshold value THL2 is stored in the defective pixel memory 16.

Again referring to the example of FIG. 2, assume that of eight candidate pixels, only two pixels (x3, y3) and (x7, y7) have the accumulated values of image data corresponding to the outputs of N times of photo-electric conversion exceeding the second threshold value THL2. In that case, only these two pixels are determined to be actually defective, and their address values are stored in the defective pixel memory 16.

As described above, not the output of one photo-electric conversion is compared with the prescribed threshold value, but accumulated value of outputs of N times of photo-electric conversion is used for determining whether the pixel is defective or not. Therefore, precision in determining the defective pixel can be improved. More specifically, even when a high output is generated temporarily, the photo-electrically converted output of a normal pixel is gradually settled to the mean value when photo-electric conversion is continued N times. Meanwhile, a defective pixel constantly outputs a high photo-electrically converted value. Therefore, when these are compared using the accumulated values, the normal pixel can be clearly distinguished from a defective one. Further, as the photo-electrically converted outputs are added repeatedly, the photo-electrically converted outputs from each pixel are increased by the number of repetition, and hence the dynamic range of photo-electrically converted outputs can be widened.

Further, it is not necessary to set the first threshold value THL1 used in setting the candidate pixels with very high precision, since it is sufficient just to prevent overlooking of the defective pixel. Namely, even when some normal pixels are erroneously included when candidate pixels are extracted, the normal pixels can be excluded subsequently in the step of comparison with the second threshold value.

Figure 4:
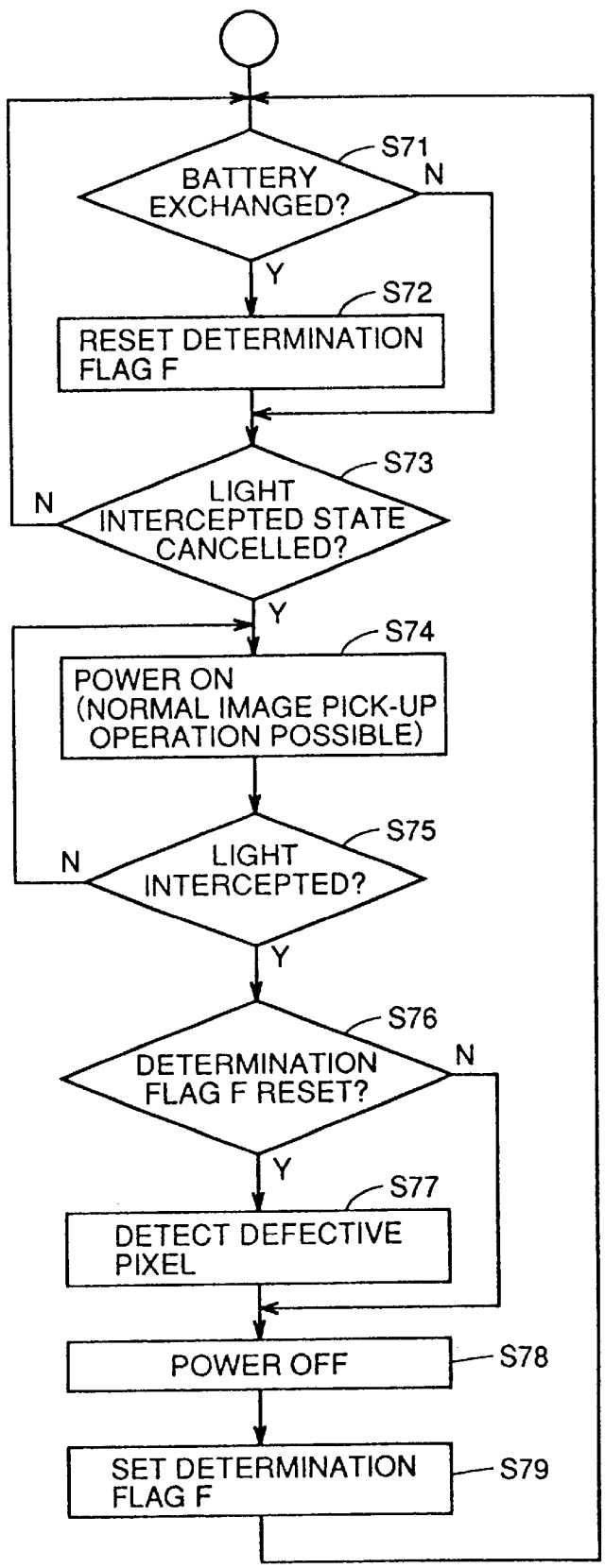
FIG. 4 is a flow chart showing the operation of a system controller 50 shown in FIG. 1.

The timing for performing the defective pixel detecting operation above will be described in the following. FIG. 4 is a flow chart showing the operation of the system controller 50 controlling the overall operation of the image pick-up device 100.

As will be described in the following, whether the defective pixel detecting operation is to be performed or not is determined dependent on whether the battery in the battery containing portion has been exchanged or not with the power being off and the light intercepting plate 30a being at the light intercepting position. First, the operation immediately after battery exchange will be described.

First, system controller 50 determines whether the battery has been exchanged or not (step S71).

If it is determined that the battery has been exchanged (step S72), system controller 50 resets the value of a determination flag F (step S72).

Meanwhile, if it is determined that the battery is not exchanged, the value of the determination flag F is not reset.

Whether the battery has been exchanged or not is determined, specifically, in the following manner. First, at the time of battery exchange, the battery is taken out from the container temporarily, and hence at that time, system controller 50 also becomes inoperative. When a new battery is attached, power is supplied from the battery to system controller 50, and the system controller 50 is initialized. In this initial state, determination flag F indicative of the determination as to whether the defective pixel detecting operation is to be performed is reset.

Thereafter, after the exchange of the battery is completed, system controller 50 determines whether or not the light intercepted state is cancelled (step S73).

More specifically, when the user is about to start normal image pick-up operation, the user moves manually or by electric power, the light intercepting plate 30a from the light intercepting position to the non-intercepting position. System controller 50 determines whether or not there is such movement, by monitoring the output from limit switch 52 (step S73).

If the light intercepted state is not cancelled, the process returns to step S71. Namely, steps S71 and 72 are repeated, which means that the image pick-up device 100 is substantially set in a standby state.

When cancellation of the light intercepted state is confirmed (step S73), system controller allows power supply from the battery 51 to various portions of the camera, allowing normal image pick-up operation (step S74).

Thereafter, system controller 50 determines whether or not the light intercepting plate 30a is moved from the non-intercepting position to the light intercepting position, based on the output from limit switch 52.

When the non-intercepted state, that is, image pick-up state is continued, the process returns to step S74. Namely, an endless loop is formed by steps S74 and S75, so that power on state continues.

Meanwhile, if the image pick-up operation ends and the user moves the light intercepting plate 30a to the light intercepting position, the light intercepting plate 30a is brought into contact with limit switch 52. System controller 50 detects that the light intercepted state is terminated, in accordance with the output from limit switch 52 (step S75).

When it is determined that the device is in the light intercepted state, then whether the value of the determination flag F is reset or not is determined (step S76).

Now, if it is the first light intercepted state after the battery exchange, the determination flag F is reset in step S72, and hence the process proceeds to S72. At this time, the above described defective pixel detecting operation is performed. More specifically, system controller 50 outputs mode signals for candidate pixel registration mode, accumulation value calculation mode and defective pixel determining mode, whereby defective pixel is detected. When defective pixel-detecting operation is completed, system controller 50 turns off the power supply to various portions of the camera (step S78). Thereafter, system controller 50 sets the determination flag F, and the process again returns to step 71.

Meanwhile, if the battery is not exchanged, determination flag F is set, and hence the process proceeds from step S76 to S78, without performing defective pixel detection (step S77).

Further, after the determination flag F is set in step S79 and battery is not exchanged, the process proceeds from step S71 to step S73, whereby the determination flag F is kept at the set state. Therefore, if it is determined that the light intercepting state is cancelled (step S73), power is turned on, allowing normal image pick-up operation.

When it is determined that the light intercepted state is resumed thereafter (step S75), whether or not the determination flag F is reset is determined (step S76).

Since battery is not exchanged, determination flag F is kept at the set state, and hence the process proceeds from step S76 to S78. Therefore, in this case, defective pixel detecting operation is not performed, and the power is turned off.

In this manner, defective pixel detecting operation is performed only once after the battery in the battery containing portion is exchanged, until the next battery exchange. Namely, when the light intercepted state is cancelled and normal image pick-up operation is performed for the first time after battery exchange and the camera is set to the light intercepted state and transition to the light intercepted state is detected from the output of limit switch 52, the defective pixel detecting operation is performed. Thereafter, the defective pixel detecting operation is not performed even when the light intercepted state is repeatedly cancelled/restored, unless the battery is exchanged. Therefore, power consumption associated with the defective pixel detecting operation can be suppressed.

Here, the battery capacity, in an electronic still camera, for example, is set to allow picking-up and storage of about 200 still images. Further, in a general CCD, frequency of generation of a new defective pixel caused by aging is sufficiently low. Therefore, defective pixel detecting operation only once at every battery exchange is sufficient to quickly discover the newly generated defective pixel.

The defective pixel memory 16 is formed by non-volatile memory, such as an EEPROM or an RAM with battery back up, so that the position data of the defective pixel stored in defective pixel memory 16 can be maintained at the time of battery exchange.

Figure 5:
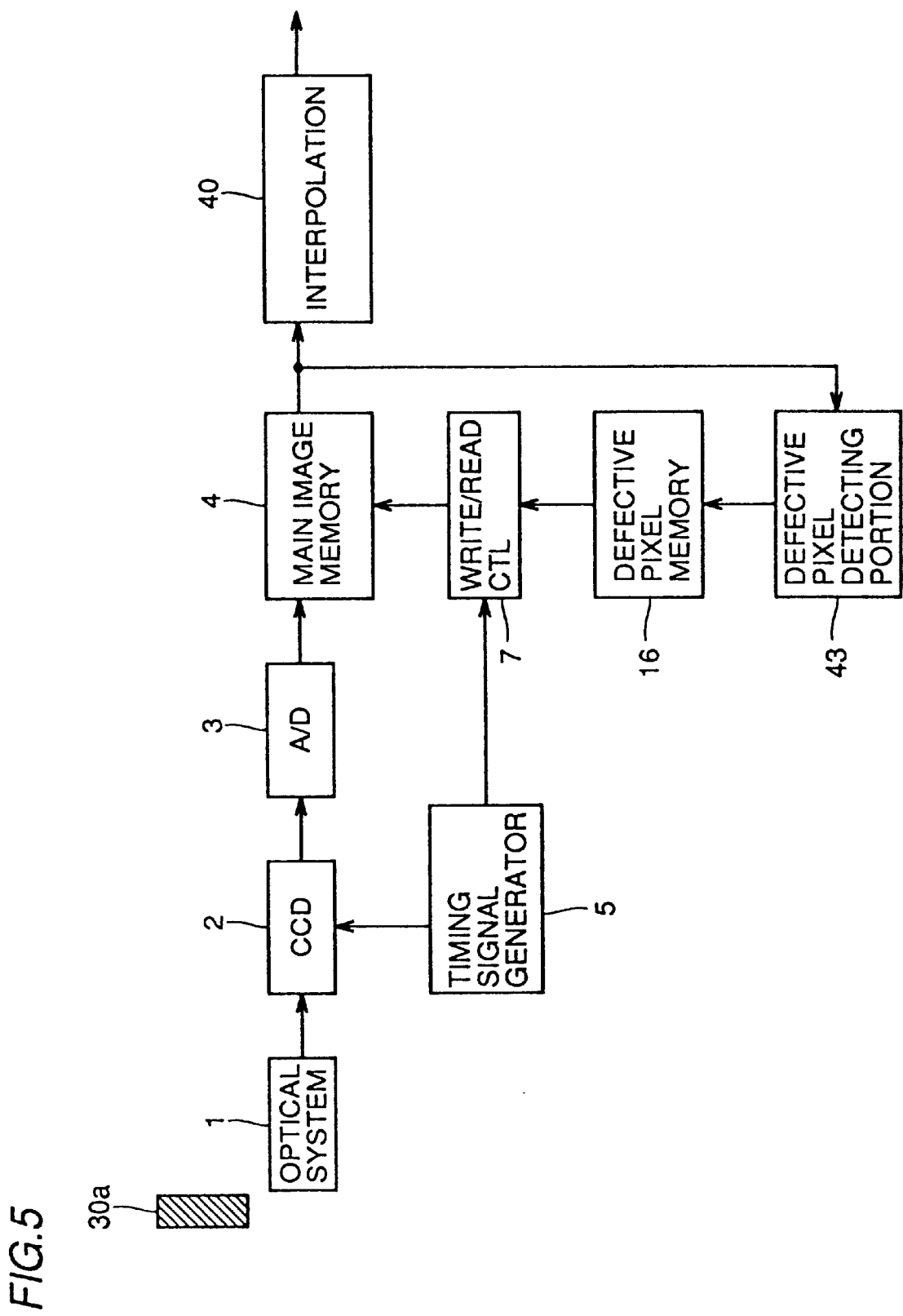
FIG. 5 is a schematic block diagram showing a structure of image pick-up device 200 in accordance with the first embodiment of the present invention.

FIG. 5 is a schematic block diagram showing the structure of the image pick-up signal output portion of image pick-up device 100.

Image pick-up device 100 includes an optical system 1 receiving light from the subject and forming an optical image therefrom, a CCD2 for converting the optical image to electric signal, an analog/digital converting portion 3 for converting an output from CCD2 to a digital signal, a main image memory 4 for storing 1 frame of image pick-up signals, converted to digital signals, a write/read operation control circuit 7 for controlling data writing and reading operation to and from the main image memory 4, a timing signal generating circuit 5 for supplying an operational clock to CCD2 and write/read control circuit 7, a defective pixel detecting portion 43 receiving an output from main image memory 4 for detecting a defective pixel in CCD2, a defective pixel memory 16 storing position data of the detected defective pixel and applying the position data to write/read control circuit 7, and an interpolating circuit 40 for interpolating that one of the image pick-up signals read from the main image memory 4 which corresponds to the defective pixel, by using image pick-up signals of the pixels therearound.

The operation of the image pick-up device 100 when the user performs normal image pick-up operation by using the device 100 which is, for example, an electric still camera will be described with reference to FIG. 5.

When the power switch provided on the body of image pick-up device 100 is turned on, light intercepting state of light intercepting mechanism 30 is cancelled. By pressing a shutter bottom (not shown), the light from the subject forms an image on CCD2 through optical system 1.

The forms optical image is subjected to photo-electric conversion at CCD2, and converted to a digital signal by A/D converter 3 pixel by pixel. The image pick-up data are successively stored in main image memory 4. When storage of the image data of all the pixels is completed, image data is successively read out pixel by pixel, from the main image memory 4.

FIG. 6 is a schematic diagram showing arrangement of color filters provided on the light receiving surface of the CCD2.

Referring to FIG. 6, color filters of three primary colors, that is, R, G and B, for example, are arranged mosaic-wise on the light receiving surface of CCD2. Namely, each pixel of CCD2 bears the color filter of any of these primary colors.

Therefore, if the defective pixel corresponds to color filter of R, for example, image data from the defective pixel is interpolated in the following manner.

FIG. 7 is a schematic diagram showing weight on the peripheral pixels for help understand the interpolating operation mentioned above.

The image data of the defective pixel at the center is interpolated by the image data from eight pixels A11 to A33 which are at upper and lower, left and right and orthogonal positions with respect to the defective pixel corresponding to the R color filter at the center. The eight pixels have respective weights allotted thereto, as shown in FIG. 7. Image data corresponding to each of these pixels is multiplied by the weight, and the resulting values are added, and the added sum is divided by the total sum of the weight, whereby the defective pixel can be interpolated.

More specifically, when image data is read from the main image memory 4, write/read control circuit 7 constantly monitors the address of the defective pixel stored in defective pixel memory 16. When the pixel corresponding to the image data to be read next is not a defective pixel, write/read control circuit 7 have the image data corresponding to the address of the pixel be output as it is.

Meanwhile, if the pixel corresponding to the image data to be read next is a defective pixel, the image data of the address of the corresponding pixel is not read. Instead, image data of eight pixels (A11, A12, A13, A21, A23, A31, A32, A33) around the defective pixel are read, which are output to the interpolating circuit 40 of the succeeding stage, as shown in FIG. 7.

Interpolating circuit 40 is controlled by write/read control circuit 7, and if the input image data does not correspond to a defective pixel, it does not perform interpolating but outputs the input image data as it is. Meanwhile, if the pixel corresponding to the input image data is a defective pixel, it calculates interpolating data for the defective pixel based on the image data values of eight pixels input for interpolating described above, in accordance with the operation represented by the equation (5). Therefore, instead of the image data from the defective pixel, image data compensated for by the image data from surrounding pixels is output from interpolating 40.

$$A = \frac{2 \times (A12 + A21 + A23 + A32) - (A11 + A13 + A31 + A33)}{2+2+2+2-1-1-1-1} \quad (5)$$

Interpolating operation can be similarly performed when the defective pixel corresponds to the color filter B or G.

The interpolating operation by interpolating circuit 40 can be implemented by using a two-dimensional digital filter.

Further, if the color filter corresponding to the defective pixel is G, interpolating operation other than the operation described above with reference to FIG. 7 may be performed.

FIG. 8 is a schematic diagram showing arrangement of peripheral pixels for interpolating, if the defective pixel corresponds to the color filter of G.

For the defective pixel corresponding to the color filter of G positioned at the center, same weight is added to four pixels at diagonal positions. By using the mean value of the image data from these four pixels, the image data at the center can be interpolated.

Further, other than the structure in which image data corresponding to the defective pixel is interpolated by the image data from a plurality of pixels therearound, as described above, a structure is possible in which it is replaced by image data from a pixel corresponding to the same color filter in the vicinity.

In FIG. 5, the block shown as the defective pixel detecting portion 43 includes candidate pixel memory 8, comparators 11 and 15, adders 12 and 14 and threshold value calculating circuit 13 shown in FIG. 1. The operation of the defective pixel detecting portion 43 may be implemented in software, by using a microcomputer. In FIG. 5, address generating circuit 6 shown in FIG. 1 is not shown.

Second Embodiment

In the first embodiment, by the comparison at comparator 15, only the address of the candidate pixel of which corresponding accumulated value exceeds the second threshold value THL2 is transferred from the position data memory portion 9 to defective pixel memory 16. More specifically, when it is determined that the accumulated value corresponding to the candidate pixel exceeds the second threshold value THL2, comparator 15 output the second registration instruction signal, so that defective pixel memory 16 takes the data from position data memory portions 9.

In the second embodiment, a defective pixel detecting circuit and an image pick-up device containing the same are provided which can reduced the number or capacity of the memory as compared with the first embodiment.

Figure 9:
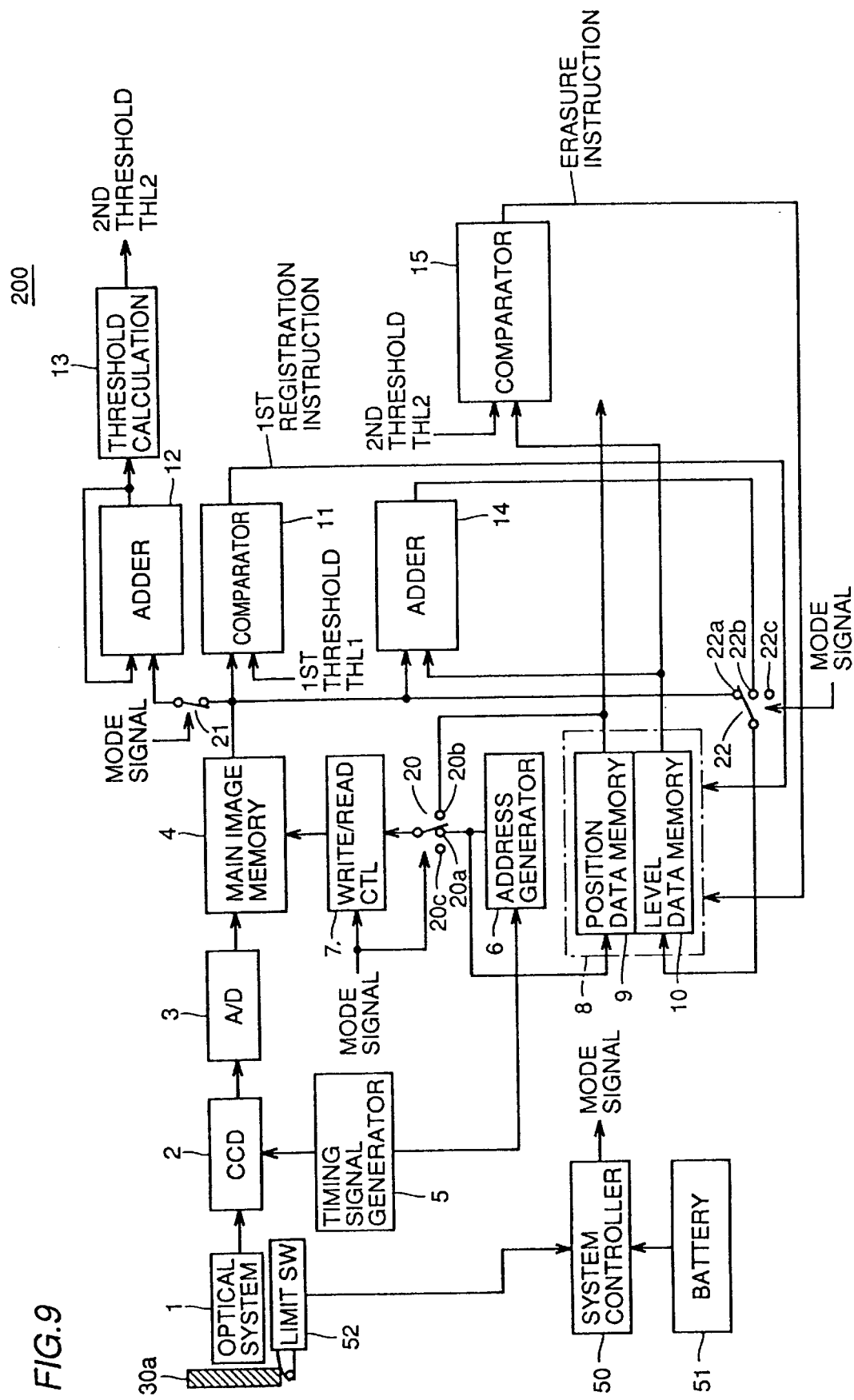
FIG. 9 is a schematic block diagram showing a structure of a defective pixel detecting portion in an image pick-up device 200 in accordance with the second embodiment of the present invention.

FIG. 9 is a schematic block diagram showing the portion related to the defective pixel detecting circuit in the image pick-up device 200 in accordance with the second embodiment.

Different from the first embodiment, in the second embodiment, the position data memory portion 9 also has the function of defective pixel memory 16, so that the defective pixel memory 16 is omitted.

More specifically, when the accumulated value of the image data corresponding to a candidate pixel is not higher than the second threshold value THL2, an erasure instruction signal is output to the candidate pixel memory 8.

Except this point, portions corresponding to those of the first embodiment are denoted by the same reference characters and description thereof is not repeated.

When it is determined that the candidate being compared by comparator 15 is determined to be not actually defective, the comparator outputs an erasure instruction signal, and upon reception of the erasure instruction signal, candidate pixel memory 8 erases the address value of the corresponding candidate pixel from the position data memory portion 9.

Therefore, when comparison of all the candidate pixels is completed in comparator 15, only the address value corresponding to the actually defective pixel is left in position data memory portion 9.

When normal image pick-up operation is to be performed, interpolating operation of the image data corresponding to the defective pixel can be performed by using the content of the position data memory portions 9.

Accordingly, in the image pick-up device in accordance with the second embodiment, as compared with the image pick-up device 100 of the first embodiment, detection of defective pixel can be carried out at high speed with high precision, while reducing the number or capacity of the memory.

Further, when it is adapted such that the defective pixel detecting operation is performed only once at every battery exchange as in the first embodiment, power consumption necessary for detecting the defective pixel caused by aging of the CCD can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pick-up device comprising:

selective light intercepting device movable between a light intercepting position and a light non-intercepting position, positioning the selective light intercepting device in the light intercepting position light limits light applied to a solid state image pick-up device, positioning the selective light intercepting device in the light non-intercepting position does allows light to be applied to the solid state image pick-up device;

a battery device that selectively supplies power to the image pick-up device, the battery device includes a replaceable battery; and defective pixel detecting device that detects a defective pixel of said solid state image pick-up device only when said light intercepting device is moved from the light non-intercepting position to the light intercepting position for the first time after said replaceable battery is replaced, the defective pixel detecting device detects defective pixels based on a level of image pick-up signal of each pixel from said solid state image pick-up device.

2. An image pick-up device comprising:

selective light intercepting device movable between a light intercepting position and a light non-intercepting position, positioning the selective light intercepting device in the light intercepting position light limits light applied to a solid state image pick-up device, positioning the selective light intercepting device in the light non-intercepting position does allows light to be applied to the solid state image pick-up device;

a battery device that selectively supplies power to the image pick-up device, the battery device includes a replaceable battery;

defective pixel detecting device that detects a defective pixel of said solid state image pick-up device only when said light intercepting device is moved from the light non-intercepting position to the light intercepting position for the first time after said battery is changed from the inactive state to the active state, the defective pixel detecting device detects defective pixels based on a level of image pick-up signal of each pixel from said solid state image pick-up device, the defective pixel detecting device includes:

image memory for storing the image pick-up signal of each pixel from said solid state image pick up device with the light intercepted, and defective pixel specifying device for specifying a defective pixel of said solid state image pick-up device, based on the image data in said image memory, wherein said defective pixel specifying device includes:

operating device for reading image data of one image plane obtained with the light intercepted from said image memory, and for comparing the data with a first threshold value pixel by pixel for extracting a possibly defective pixel, and accumulated value calculating device for calculating accumulated value of image data of each said possibly defective pixel, by reading a prescribed number of times the image pick-up signal from said solid state image pick-up device with the light being intercepted; and wherein said operating device specifies, by comparing said accumulated value of each said possibly defective pixel with a second threshold value, that possibly defective pixel of which accumulated value exceeds said second threshold value as a defective pixel;

said image pick-up device further comprising replacing device for replacing the image pick-up signal corresponding to said defective pixel with a signal based on an image pick-up signal of at least one surrounding pixel selected on the basis of data of the defective pixel position specified by said operating device.

3. The image pick-up device set forth in claim 2, wherein said operating means calculates said second threshold value based on mean value of the image data of said one image plane calculated in the process of extracting said possible defective pixel and based on a preset offset value.

4. A method of operating an image pick-up device comprising the steps of:

selectively moving a light intercepting device between a light intercepting position and a light non-intercepting position, positioning the selective light intercepting device in the light intercepting position light limits light applied to a solid state image pick-up device, positioning the selective light intercepting device in the light non-intercepting position does allows light to be applied to the solid state image pick-up device;

selectively supplying power to the image pick-up device from a battery device including a replaceable battery; and detecting a defective pixel of said solid state image pick-up device only when said light intercepting device is moved from the light non-intercepting position to the light intercepting position for the first time after said replaceable battery is replaced, the detecting defective pixels is based on a level of image pick-up signal of each pixel from said solid state image pick-up device.

* * * * *

UNITED STATES PATENT AND TRADEMARK OFFICE
CERTIFICATE OF CORRECTION

PATENT NO. : 6,002,433
DATED : December 14, 1999
INVENTOR(S) : Nobuhide DOTSUBO, Hiroshi AKIZUKI It is certified that error appears in the above-identified patent and that said Letters Patent is hereby corrected as shown below:

On the title page, [75]    Inventors should read --Nobuhide DOTSUBO, Hiroshi AKIZUKI-- .

Signed and Sealed this

Fifth Day of September, 2000

Attest:

Q. TODD DICKINSON

*Attesting Officer*    *Director of Patents and Trademarks*